United States Patent [19]

Ashworth et al.

[11] 4,264,310
[45] Apr. 28, 1981

[54] HELMET WEIGHT SIMULAOR

[75] Inventors: Billy R. Ashworth, Newport News; Alton C. Hall; Clyde E. Clark, both of Gloucester, all of Va.

[73] Assignee: The United States of America as represented by the Administrator of the National Aeronautics and Space Administration, Washington, D.C.

[21] Appl. No.: 43,913

[22] Filed: May 30, 1979

[51] Int. Cl.³ .............................................. G09B 9/08
[52] U.S. Cl. .................................................... 434/59
[58] Field of Search ................... 35/12 E, 12 G, 12 H, 35/12 R; 272/94; 73/432 SD

[56] References Cited

U.S. PATENT DOCUMENTS 3,309,795  3/1967  Helmore ............................ 35/12 E
3,824,707  7/1974  Ashworth et al. ................. 35/12 E

OTHER PUBLICATIONS

Christensen et al., "Study to Tetermine Methods of Simulating Effects", Armour Research Found. of IIT, Oct. 1958.

Primary Examiner—Peter Chin
Attorney, Agent, or Firm—Howard J. Osborn; John R. Manning; William H. King

[57] ABSTRACT

A device for providing acceleration cues to the helmet of a simulator pilot. Pulleys are attached to both shoulders of the pilot. A cable is attached to both sides of the helmet and extends through the pulleys to a takeup reel that is controlled by a torque motor. Control signals are applied to a servo system including the torque motor, the takeup reel and a force transducer which supplies the feedback signal. In one embodiment of the invention the force transducer is in the cable and in another it is in the takeup reel.

5 Claims, 4 Drawing Figures

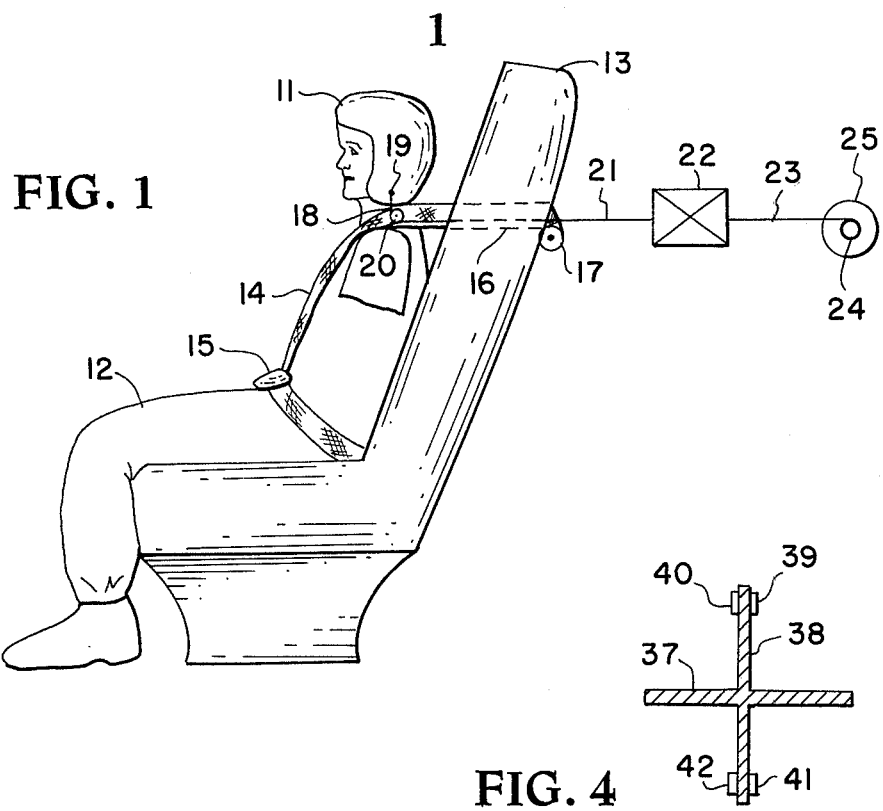
FIG. 1
FIG. 4
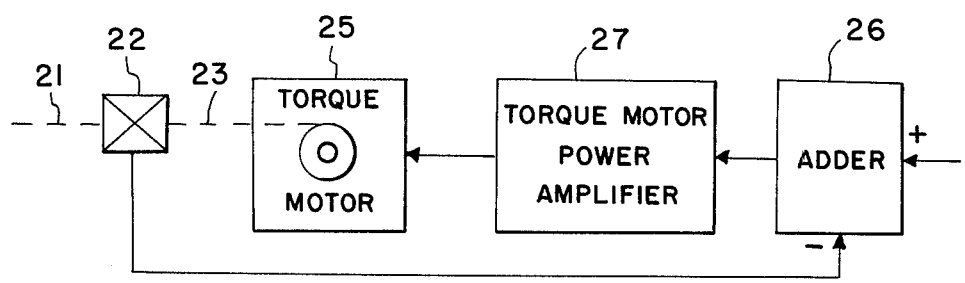
FIG. 2
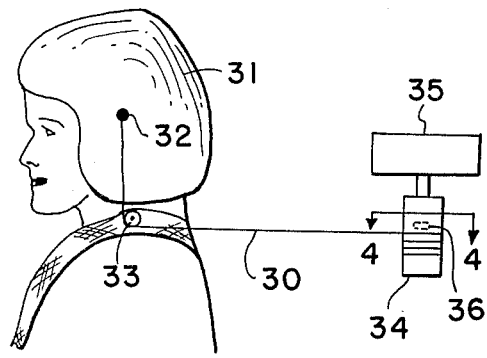
FIG. 3

HELMET WEIGHT SIMULAOR

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates generally to simulators and more specifically concerns apparatus for providing acceleration cues to aircraft simulator pilots.

Acceleration cues play an important role in providing an aircraft pilot information concerning the dynamic state of his aircraft. These acceleration cues are not present in fixed base simulators and are only partially present in limited motion base simulators. The two most noticeable of the acceleration cues to an aircraft pilot are his increased body weight which causes greater pressure on his buttocks and an increase in weight of his helmet which causes an increased load on his neck and shoulder muscles. There are many simulators that provide increase in body weight acceleration cues; however, there is no known device that will adequately provide increase in helmet weight acceleration cues.

The primary object of this invention is to provide a device that adequately provides increase in helmet weight acceleration cues to a simulator pilot.

Another object of this invention is to provide helmet weight acceleration cues to a simulator pilot without interfering with or restricting the movements on the pilot.

Other objects and advantages of this invention will appear obvious hereinafter and in the drawings.

SUMMARY OF THE INVENTION

The invention is a device for providing acceleration cues to the helmet of an aircraft simulator pilot. Pulleys are attached to both shoulders of the simulator pilot. Cables are attached to both sides of the helmet and extend through the pulleys to a takeup reel which is driven by a torque motor. In one embodiment of the invention a force transducer is located in the cable and produces a signal proportional to the tension on the cable. The signal produced by the force transducer is used as the feedback in a servo and subtracts from the input command signals to the torque motor. In a second and preferred embodiment of the invention the force transducer is attached to the takeup reel and produces a signal proportional to the torque on the takeup reel. In the second embodiment of the invention one complete device is used for each side of the helmet.

BRIEF DESCRIPTION OF THE DRAWINGS

FIG. 1 is a schematic drawing of a first embodiment of the invention;

FIG. 2 is a block diagram of the electrical circuitry used in the invention;

FIG. 3 is a schematic drawing of a second and preferred embodiment of the invention; and FIG. 4 is a schematic drawing showing how the force transducer is mounted on the takeup reel in FIG. 3.

DETAILED DESCRIPTION OF THE INVENTION

Turning now to the embodiments of the invention selected for illustration in the drawings, the number 11 in FIG. 1 designates a standard helmet on a simulator pilot 12 who is seated in a standard simulator seat 13. The pilot is secured to seat 13 by a standard lap belt 15 and a standard shoulder harness 14. The shoulder harness 14 extends through an opening 16 in seat 13 to a standard inertial reel 17 for the shoulder harness.

A cable 18 is attached to helmet 11 at 19 by any suitable means. Cable 18 is attached to both sides of the helmet such that it loops behind the neck of the pilot. Small pulleys 20 are attached to the shoulder harness 14 over both shoulders of the pilot. A cable 21 is attached to cable 18 at the middle of the loop and extends back through opening 16 to one side of a force transducer 22. A cable 23 is attached to the other side of force transducer 22 and to the takeup reel 24 of a torque motor 25. Pulleys 20 are located such that with cable 18 in the pulleys and a force exerted on cable 18 by torque motor 25 the resulting force on helmet 11 is straight down. The downward pull on the helmet through the pulleys attached to the shoulder harness also results in an upward pull (loosening) of the shoulder harness which is a desired cue.

The force transducer 22 and the torque motor 25 are connected in an electrical circuit as shown in FIG. 2 to control the downward force on helmet 11. The input signal for controlling the downward force on helmet 11 is applied to the input of an adder 26. The output of adder 26 is applied through a power amplifier 27 to torque motor 25. The resulting tension on cables 21 and 23 causes force transducer 22 to produce an output signal which is fed back and subtracted from the input signal by adder 26.

In the embodiment of the invention shown in FIGS. 1 and 2 the pilot's movement is limited by the distance between the pulleys 20 and the torque motor 25. In many compact arrangements this restriction requires frequent adjustments. Also with this embodiment of the invention it is necessary that electrical wires run along cable 23 to transducer 22. These deficiencies are corrected in the embodiment of the invention shown in FIG. 3 by moving the force transducer into the take-up reel in the form of a torque transducer sensing the force between the motor shaft and the takeup reel.

In FIG. 3 a cable 30 is attached to a helmet 31 and 32 by any suitable means. Cable 30 extends through a pulley 33, attached to the shoulder harness 14 of the pilot, to a take-up reel 34 that is driven by torque motor 35. A torque transducer 36 is attached to takeup reel 34 and produces an electrical signal proportional to the force between the motor shaft and the takeup reel. The torque transducer and torque motor are connected in an electrical circuit the same as or similar to that shown in FIG. 2. When the embodiment of the invention shown in FIG. 3 is used, one must be used for each of the two sides of the helmet. This not only provides more realistic forces on the pilot, but allows for differential force on each side of the helmet.

FIG. 4 which is an enlarged cross-section 4—4 of the take-up reel 34 shows how the torque transducer is attached to the takeup reel. The takeup reel includes two cross pieces 37 and 38 with resistance elements 39, 40, 41 and 42 attached to the two ends of pieces 38 as shown. Resistance elements 39–42 change in resistance in accordance with the tension or compression they are subjected to. Resistance elements 39–42 are connected in a normal strain gage bridge which produces an electrical signal proportional to the force between the motor shaft and the takeup reel.

The advantages of this invention are numerous and it is especially adapted for use with other devices for providing acceleration cues to simulator pilots. It provides helmet acceleration cues and does not interfere with the movements of the pilot.

It is to be understood that the forms of the invention herewith shown and described are to be taken as preferred embodiments. Various changes may be made in the shape, size and arrangement of parts without departing from the invention.

What is claimed is:

1. A device for providing acceleration cues to the helmet of an aircraft simulator pilot in response to input electrical signals comprising:

pulley means attached to both shoulder harnesses of said simulator pilot;

cable takeup reel means for dispensing and retrieving cable;

torque motor means for rotating said cable takeup reel means;

cable means attached to both sides of said helmet and engaging and extending through said pulley means to said cable takeup reel means;

transducer means for producing feedback electrical signals proportional to the tension in said cable means; and means for applying the difference between said feedback and input electrical signals to said torque motor means thereby allowing free movement of the pilot's head and whereby the tension on said cable means can be controlled while the pilot's head is or is not in motion and in all different positions.

2. A device for providing acceleration cues according to claim 1 wherein there is a separate transducer means, torque motor means and cable means for each of the both sides of said helmet.

3. A device for providing acceleration cues according to claim 1 wherein said transducer means is located in said cable means.

4. A device for providing acceleration cues according to claim 1 wherein said transducer means is located on said cable takeup reel means.

5. A device for providing acceleration cues according to claim 4 wherein said transducer means produces signals proportional to the torque on said cable takeup reel means.

* * * * *